United States Patent [19]

Longenecker et al.

[11] 3,971,481
[45] July 27, 1976

[54] MATERIALS HANDLING APPARATUS

[75] Inventors: John G. Longenecker, Ozone Park, N.Y.; Manuel Jesus Rubio, Bridgeport, Conn.

[73] Assignee: Roberto Gonzalez Barrera, Monterrey N.L., Mexico

[22] Filed: Apr. 21, 1975

[21] Appl. No.: 569,800

[52] U.S. Cl. ............................ 214/6 H; 198/29; 198/34; 198/76; 214/6 DK; 271/82; 271/218; 271/243
[51] Int. Cl.² ................... B65G 57/03; B65G 47/26
[58] Field of Search ............... 214/6 H, 6 DK, 6 D; 198/29, 34, 76; 271/69, 82, 186, 218, 243

[56] References Cited
UNITED STATES PATENTS

| | | | |
|---|---|---|---|
| 2,205,767 | 6/1940 | Lamb | 271/218 X |
| 3,015,919 | 1/1962 | MacDonald | 198/34 X |
| 3,250,375 | 5/1966 | Bonthuis et al. | 198/34 |
| 3,255,895 | 6/1966 | Klingler | 271/218 X |
| 3,865,362 | 2/1975 | Luffy et al. | 271/82 |

*Primary Examiner*—L. J. Paperner
*Attorney, Agent, or Firm*—William G. Rhines

[57] ABSTRACT

This invention relates to food processing apparatus, and in one embodiment includes collating apparatus for synchronizing the position of the leading edge of irregularly shaped, supple objects, such as tortillas, and apparatus for removing such objects individually from the synchronizing apparatus by grasping them by their front edges and transporting them to an associated stacking apparatus.

37 Claims, 9 Drawing Figures

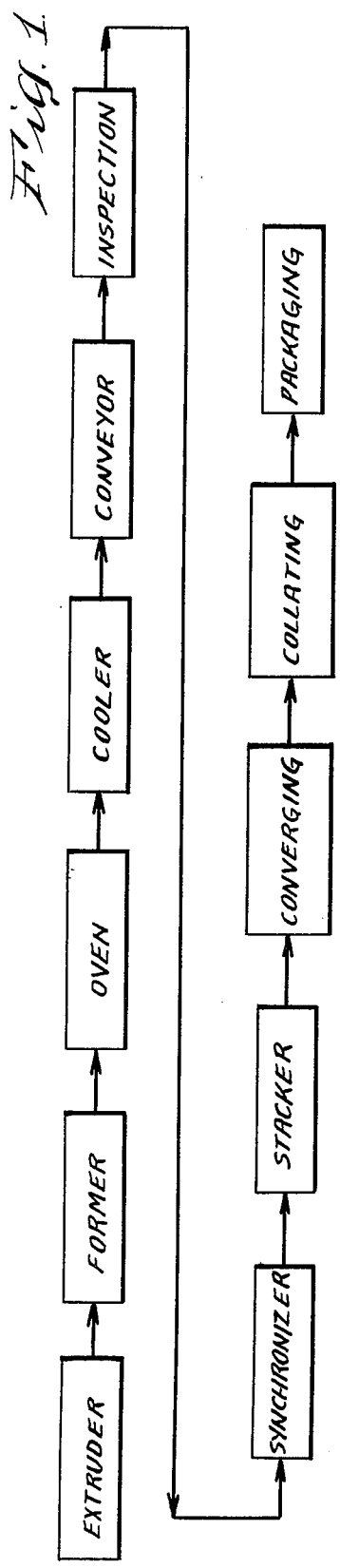
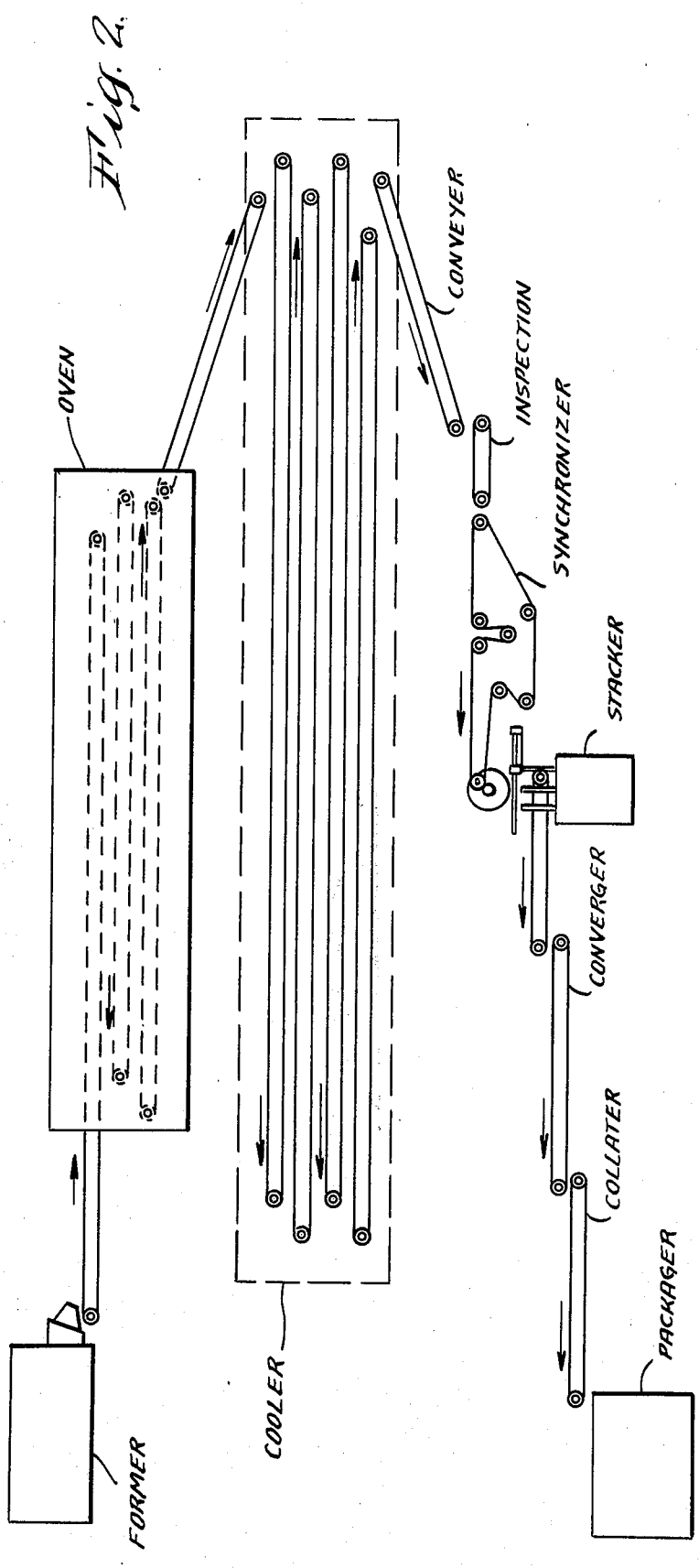

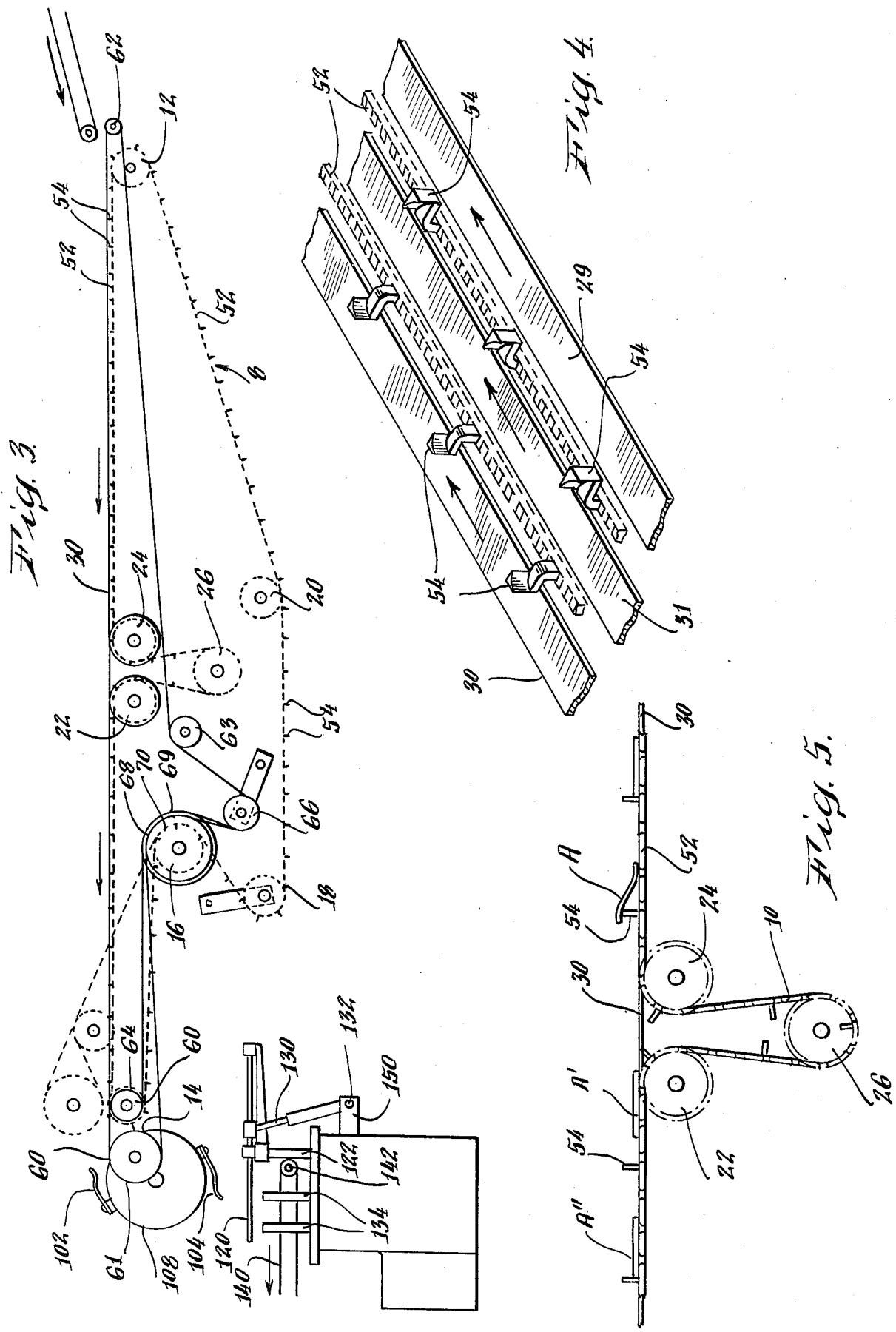

MATERIALS HANDLING APPARATUS

BACKGROUND OF THE INVENTION

In the past, attempts to manipulate certain supple, irregularly shaped materials to facilitate their mass production have encountered a number of difficulties. Tortillas, for example, being a mixture of corn flour and water, are very supple and tend to come apart easily, and, although typically they are said to be generally round in shape, actually they are dimensionally quite irregular. A method of producing such materials is to prepare the dough, extrude it, transport the raw tortillas by means of a conveyor belt into an oven, and there cook the tortillas which are then dried and cooled in a cooler. It is from this point on that the invention herein described is particularly applicable, because in the cooked state such torttillas have proved to be very difficult to handle using automatic machinery. This is because in the condition that they are in when they are discharged from the cooler, they are not susceptible to being manipulated by being pushed or slid because, in physical characteristics they are somewhat similar to a flat piece of soft rubber, about 0.25 cm. thick and approximately 10–15 cm. across and have a tendency to bunch up, wrinkle, and overlay themselves. Typically, by this point in the process no matter how regular the intervals at which the raw material has been admitted to the process, they will be discharged at irregular intervals, sometimes even overlapping each other, because some may have shifted or gotten caught on objects as they pass through the ovens and cooler, or for other reasons. Because of their physical characteristics, and particularly their propensity to pull apart, it is extremely difficult to untangle them and synchronize them mechanically, utilizing apparatus or techniques which are typically applied to handling other types of foodstuffs and objects, such as cans, or other less supple objects, which may be placed in desired positions by use of bumpers, flanges, levers, or other mechanisms which are brought to bear on the edges or other surfaces of the objects as a means to push them into position. With materials having physical characteristics such as those of a tortilla, the use of such apparatus or techniques frequently results in the material merely doubling up or wadding. However, to avoid excessive hand labor, it is desired to synchronize such objects positionally so that they may be further handled by automatic machinery, and to provide such automatic machinery so that they may be stacked or otherwise grouped in preparation for packaging.

Accordingly, it is an object of this invention to provide a means for synchronizing the position of flat, irregularly shaped objects, particularly where such objects are supple and/or have limited ability to resist being pulled apart.

It is another object of this invention to provide such means suitable for use with other apparatus for further handling such objects.

Yet another object of this invention is to provide such apparatus in combination with stacking apparatus.

SUMMARY OF INVENTION

Desired objects may be achieved through practice of the present invention which, in one embodiment, comprises a synchronizer for selectively positioning flat, irregularly shaped objects, comprising spacer chains moveable in parallel with and between co-planar belts which are moveable in the same direction as the spacer chains but at a faster speed, whereby such objects being carried by the faster moving belts are made to catch up to spaces which are "downstream" on the spacer chains, following which, the objects which have come into contact with spacers, whether by such a "catching up" process, or because of having originally been draped over spacers as they are discharged from the cooler will travel along at the same speed as that of the spacer chains, and not that of the faster moving belts. Each object as it is originally deposited on the spacer chains from the cooler will be in one of two positions: i.e., either between sets of spacers without overlapping any spacers, or positioned atop a set of spacers; in either case with the associated belts slipping past the object. The latter situation is rectified in a preferred embodiment of the present invention by causing the spacer chains to dip out from under the objects which continue to be supported on the associated belts, and then causing the chains to re-emerge upward at a point such that, the timing sequence of the spacers having been altered because of the added distance traveled by the chains through the "dip" area, as the spacers are re-inserted into the plane of the objects, the spacers on the chains initially will be spaced apart downstream from the objects by a gap. Thereby the objects being carried along by the associated belts at a speed faster than that of the spacer chains will eventually catch up to, and abut, a set of spacers, and this will occur with respect to those objects which previously had been abutting spacers as well as those which had been positioned atop spacers. This assures front end "registration" or positioning of all objects being carried along by the synchronizer mechanism as they come to the end portion of the synchronizer. IN another embodiment of the present invention, such a synchronizer is associated with a "ferris wheel" for grasping the objects from the synchronizer by their leading edges and transferring them to an associated stacker device.

DESCRIPTION OF DRAWINGS

This invention may be understood from the description which follows and from the accompanying drawings in which FIG. 1 is a schematic drawing of a process in which this invention may be used, FIG. 2 further illustrates apparatus useful in carrying out the process shown in FIG. 1, FIG. 3 illustrates synchronizer apparatus embodying the present invention, FIG. 4 illustrates certain details of this invention shown in FIG. 3, FIG. 5 illustrates the manner in which the embodiment of this invention shown in FIG. 4 operates.

DESCRIPTION OF PREFERRED EMBODIMENTS

Figure 6:
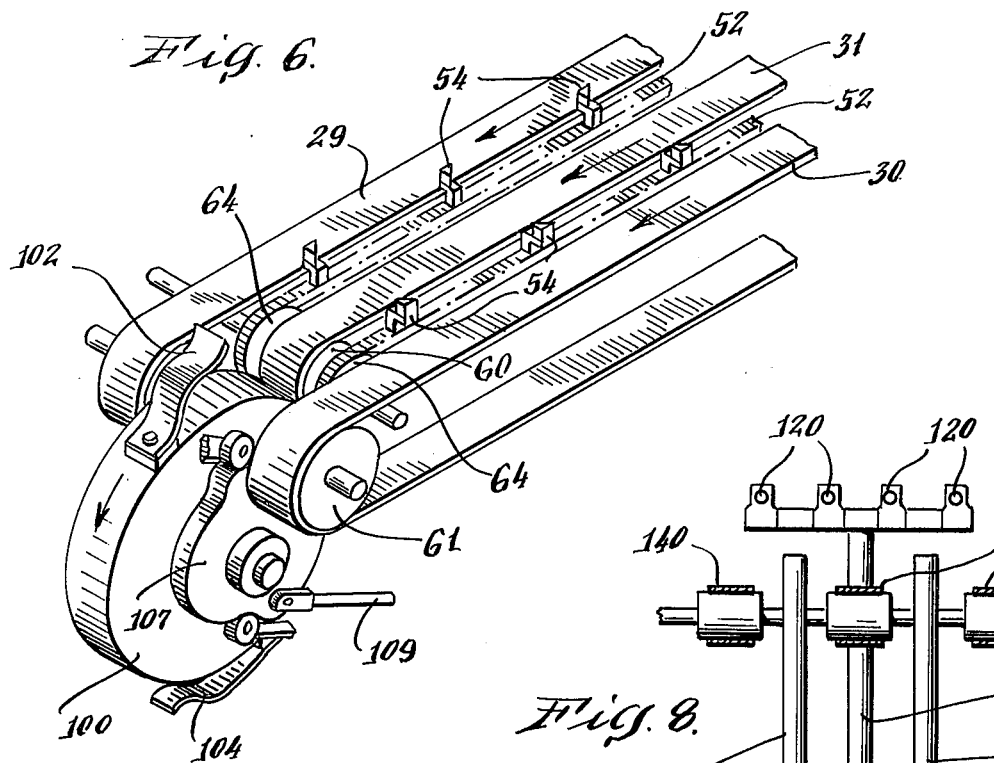
FIG. 6 illustrates a selected portion of the apparatus shown in FIG. 3.

Referring first to FIG. 1, there is illustrated a flow diagram illustrating a process for making tortillas; an application in which the present invention may be utilized. Corn flour, mixed with water and positioned in a mixer-extruder device, is extruded and the extrusion formed into pieces. Such pieces may be made flat, to form regularly shaped, relatively thin (e.g. 0.25 cm.±) pads of material. Such pieces are then passed into an oven where, as shown in FIG. 2 in greater detail, they are cooked while being carried along on endless belts, and from which they are passed into a cooler, where a series of offset endless belts permit the tortillas to be passed back and forth and turned over as they are cooled, until finally they are ejected from the cooler and are carried past an inspection station where defective tortillas are removed on their way to a synchronizer and acceptable tortillas are permitted to continue into the synchronizer. In the synchronizer, which will be described later in greater detail, the tortillas are spaced, using their leading edges as registration indices, so that they may be picked off of the synchronizer, for example, by a ferris wheel of the type hereinafter described, and stacked. The tortillas so stacked may then be transported to a converger, where the stacks are brought close together, released in sequence from the collator, and formed into a single-file line of stacks in preparation for final packing.

As noted above, one of the problems associated with such a process is that the tortillas coming out of the cooler may tend to bunch up or otherwise emerge in spacings with respect to each other which are not sufficiently regular to permit mechanized apparatus to further handle them. For example, they regularly overlap each other, and virtually never are the same distance apart, because of the irregularity of the shape and dimensions of the tortillas, and because of the randomness with which they emerge from the dryer. To rectify this situation, a synchronizer embodying the present invention may be utilized advantageously.

Such a synchronizer is illustrated in FIGS. 3, 4, 5 and 6. Referring first to FIG. 3, the synchronizer 8 comprises continuous spacer chains 52 positioned about table sprockets 12, 14, a drive sprocket 70 associated with roll 16, a tension sprocket 18, and idler sprockets 20, 22, and 24, and a timing sprocket 26. Attention is directed particularly to the arrangement of the idler sprockets 22, 24 and the timing sprocket 26, about which more will be explained later. Also part of the synchronizer apparatus 8 are belts 29, 30, positioned on each side of the chains 52, and belt 31 positioned between each pair of spacer chains 52. This relationship is more clearly shown in FIGS. 4 and 6, which also show greater details of the spacer chains 52, the belt 31, and the belts 29, 30. As shown in FIG. 4, the spacer chains 52 consist of standard link chains which are spaced apart from and substantially parallel to each other, and are continuous, and have metal spacers or "ears" 54 affixed thereto at regular intervals. As shown in FIG. 4, these spacers may be contoured to adapt them for use with such more or less round objects as tortillas, and to facilitate the centering of such objects as hereinafter described. Of course, they may also be straight, or of any of a number of shapes adapted to the objects to be handled. It should also be clear that even though only one such set of belts and associated spacer chains are shown in FIG. 4, any number of such sets of such structures may be operated in parallel.

It should be noted that the upper edges of the spaces or ears normally extend to substantially a uniform distance above the plane of the flat belts 29, 30 and 31. Referring back to FIG. 3, it will be seen that the belts 29 30 and 31 are continuous and are positioned about belt table rolls 61, 62, 64, idler rolls 63, a tension roll 66, and the outer surface 68 of the drive roll 16. This last relationship is of particular interest since, because the outer surface 68 of the drive roll 16 is larger in diameter than the sprocket 70 over which the spacer chains 52 are positioned, the belts 29, 30 and 31 will travel in the same direction but at a faster rate of speed than do the spacer chains 52. Similarly, the drive roll surface 69 over which the belt 31 is positioned, is larger in diameter than the roll surfaces over which the belts 29, 30 are positioned, so that the belt 31 travels at a higher rate of speed than do the belts 29, 30. The reasons for these arrangements are set forth below.

Referring again to FIG. 4, it will be seen that as tortillas fall out of the cooler and onto the chains and/or the belts, two things may happen as a result of the speed differential as between the belts and as between the belts and the chains, provided the tortillas fall between spacers. Since the belts 29, 30 and 31 travel faster than the chains 52, the tortillas will be moved forward until they abut spacers 54, thereby effecting registration, or positional fixing of the forward-most edges of the tortillas. Also, if any tortillas fall to one side or the other of the chains 52, the relative movement of one or the other of the belts 29, 30 with respect to the faster moving belt 31, will cause the tortillas to move inward toward the center of the spacer chains as well as forward toward the ears 54 in a kind of circular motion. Thus, the tortillas which fall between spacers as they come out of the cooler will be sufficiently accurately positioned to enable them to be picked off of the chains by mechanical apparatus as hereafter described, since the periodicity with which they are presented will be regulated by the registration of the tortillas abutting a spacer 54 in each instance, and since they will be sufficiently centered to be within the normal operating capability of such mechanical means effectively to intercept the tortillas. An exception is where the tortilla, in falling from the cooler egress means, falls across an ear 54. This is the situation illustrated for tortilla "A" in FIG. 5. To cope with such situations, a dip is made in the path of the spacer chains 52, as illustrated in FIG. 3 where the chain 52 is shown as passing about the idler sprockets 22, 24 and the timing sprocket 26. The spacing between the idler sprockets 22, 24 is such that not only can the ears 54 clear each other as they pass between the sprockets 22, 24, but also, in coordination with the speed of the belts 29, 30 and 31, any given tortilla, coming to the location of the dip, and now resting either abutting or over an ear 54, as it is carried across the dip by the belts 29, 30 and 31, "sees" a space interval between its leading edge and the pair of spacers 54 next downstream from it. As a result, as the tortillas arrive at the opposite side of the dip, they are interposed between spacers on the chains, at a point which is somewhere between sets of pairs of spacers, rather than abutting a spacer, or draped over a spacer, as formerly was the case. Therefore, the effects of the speed differential between the belts and the chains again occur, to move the tortillas into abutment with the downstream spacers once more. Thus, any tortilla which formerly was draped over spacers 54, has the spacers 54 removed from under it by virtue of the spacer chains 52 pulling out from under the plane of the belts 29, 30 and 31 as the chains 52 pass through the dip, but is faced with spacers on the chains 52 which have already emerged from the dip back to the plane of the belts 29, 30 and 31 at a spaced distance from the spacers sufficiently short of the spacers to ensure that the leading edge of the tortilla (i.e., the edge which faces in the direction of movement) will be intercepted by the trailing surface of such newly-emerged spacers. Tortillas A' and A" in FIG. 5 illustrate this sequence of events.

By this means, synchronization of the tortillas is assured with sufficient accuracy to fall within the capability of associated pick-up and stacking devices of the type hereinafter described.

It will be clear, however, that although the foregoing description is in terms of an embodiment having a single set of spacer chains which dip in the middle, the effect is the same as having two sets of spacer chains set up in tandem, and thus it is within the contemplation of this invention that such a tandem chain arrangement may also be used. Of course, in this event, even though the spacing between spacers on one of the sets of chains may desirably be the same as the spacers between the spacers on its associated tandem set of chains, the "timing" between spacers from the first set to its associated tandem set must be different than the timing sequence at which spacers on the first set will pass a given fixed reference point so that as objects pass from the first set to the second set, it will be assured that the objects will fall between spacers as on the second set. It should be clear, that the basic concepts embodied in this invention may be carried out in more than two sequential steps if desired for some reason, whether by a succession of dips or of tandem chains, or of a combination of the two.

FIG. 6 illustrates in further detail the portion of the synchronizer apparatus shown in FIG. 3, in the region of its discharge end. As shown in FIG. 6, the roll 60 which supports the innermost belt 31 and the sprockets 64 which support the chains 52 are positioned so that this belt and the chains 52 reverse their direction of travel short of the outer edge of the ferris wheel 100 and the position of the rolls 61 where the outer belts 29 and 30 reverse their direction. By this means, it is assured that tortillas being carried along through the synchronizer will be fed into the clamps of the ferris wheel 100 while the inner belt 31 and the spacers 54 on the chains 52 will clear the outer edge of the ferris wheel 100.

Figure 7:
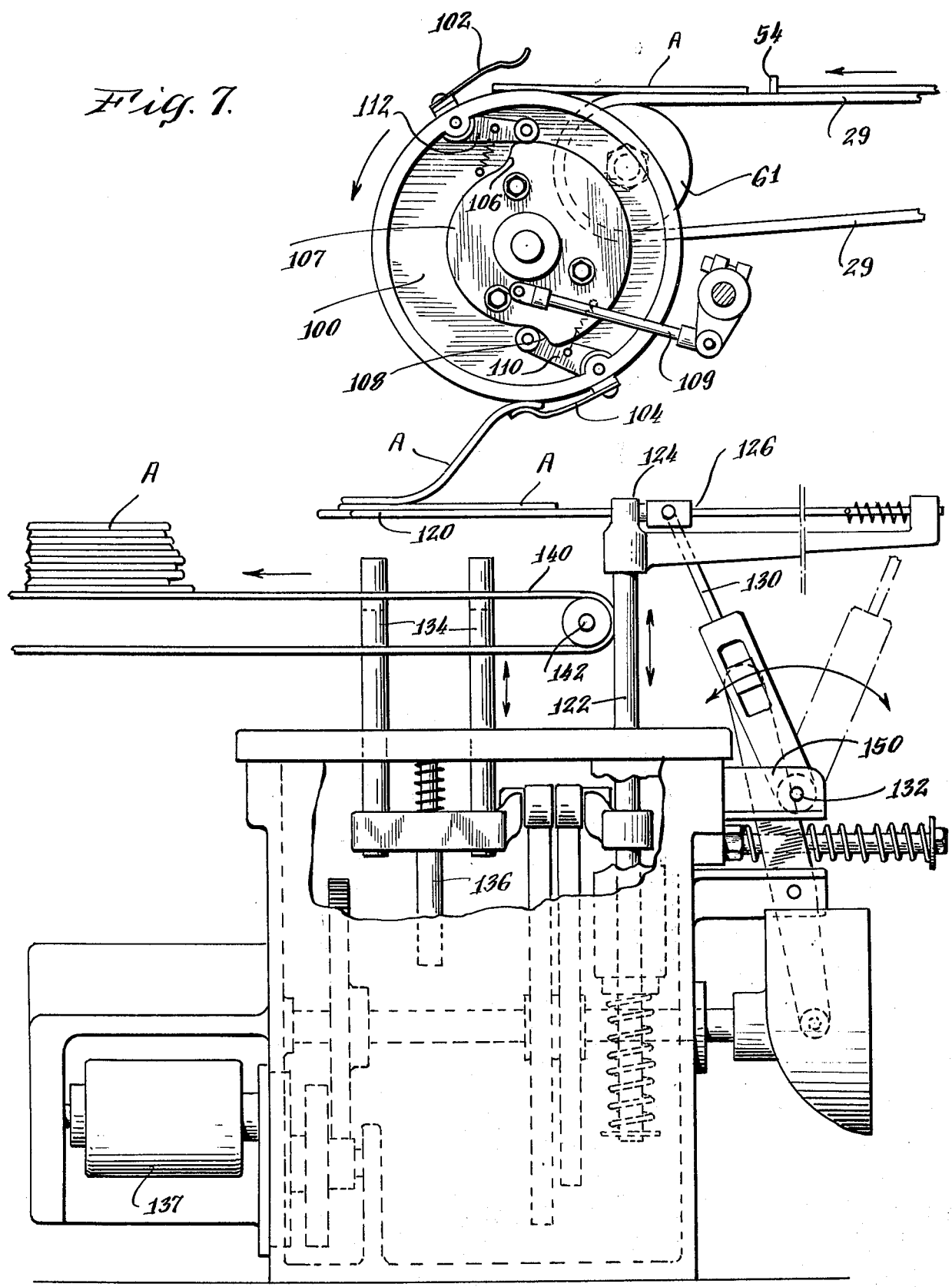
FIG. 7 illustrates an apparatus which may be used in combination with embodiments of this invention such as that shown in FIGS. 3–6.

FIG. 7 illustrates picking and stacking devices useful in connection with this invention. A ferris wheel 100 has outer clips 102, 104 for receiving and holding tortillas A as the ferris wheel 100 turns. As illustrated, the ferris wheel may have interval camming structures 106, 108 which may be utilized to actuate levers 110, 112 and thereby cause the clips 104, 102 to be opened at the top of each revolution to receive a tortilla (e.g. "B") and then closed, and then to be opened at the bottom of each revolution to release the tortilla (e.g. B) so grasped.

It should be noted that it has proved advantageous for the ferris wheel 100 to rotate intermittently, so that it is actually stopped at the point in time when it is receiving and discharging tortillas, because this assures the tortillas are not torn apart by the relative motion of the wheel. To achieve this, the ferris wheel may be driven by a speed differential device of known design whereby, through counterdirectionally operating mechanism, the net speed of the wheel may be reduced to zero periodically (i.e., once each half revolution, in this case), during which periods of being stopped, the internal cam wheel 107 may be actuated by means of the lever arm 109 to cause the cams 106, 108 to actuate the lever arms 112, 110 respectively, and thereby to cause the clips 102, 104 to move; in each case, the topmost of the clips at a given instant to close on a tortilla, and the bottom-most of the clips to release a tortilla.

FIG. 7 also illustrates a stacking device useful in connection with the operation of this apparatus. It comprises a primary lowering device having a multiplicity of times 120 onto which tortillas may be placed to form a stack as they come from the ferris wheel 100. The tines 120 are supported by a main support 122 which is mechanically interconnected with the ferris wheel 100 so that the support 122 will drop incrementally as each tortilla is placed on the tines 120. Since the tines 120 are held by eyelets 124 on the top of the support 122, the tines 120 are freely moveable laterally. To achieve this, the ends 126 of the tines 120 are interconnected with an extensible lever arm 130 which, in turn, can be swung through an arc about pivot pin 132. Positioned beneath the tines 120, is a secondary lowering device which also is interconnected by means of a shaft 136 to means 137 for incrementally lowering the pedestals hereinafter described. As is further shown in FIG. 8, the pedestals are so aligned with respect to the tines 120 that they may pass by each other as hereinafter described, and are of sufficient top surface area to support the tortillas which come to be held thereon. Associated with the mechanism are three conveyor belts 140 which pass between the pedestals of the secondary lowering device and are supported by roll 142 to transport stacks of tortillas away as hereinafter described.

Figure 8:
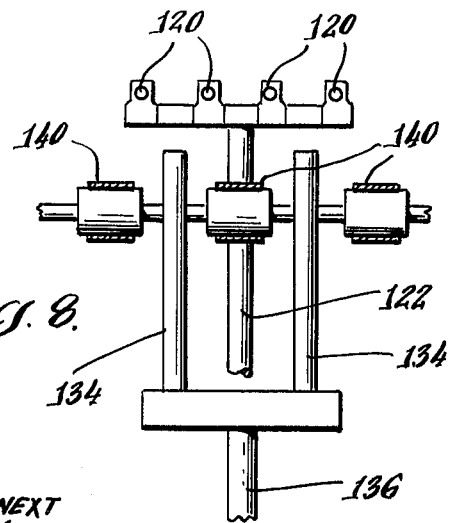
FIG. 8 illustrates in further detail a portion of the apparatus shown in FIG. 7.

FIG. 8 illustrates an end view of the mechanism shown in FIG. 7, to show that actually four pedestals 142 may be used advantageously in the secondary lowering device, along with three belts 140, and that in such an arrangement, four round tines 120 may be used. With such an arrangement, adequate support for the tortillas throughout all phases of the operation is assured, while, at the same time, it is possible for the various components to move past each other as described above to effect transfer of the stacks of tortillas as they are being stacked from one set of components to the next; i.e. from the tines 120 of the primary lowering device to the pedestals 142 of the secondary lowering device, and to the conveyor belts 140 by which the stacks are transported away.

In operation, tortillas are placed on the tines 120 as they come from the ferris wheel 100. As they are stacked, the tines 120 are incrementally lowered. When half of a stack is made, it is transferred from the tines of the primary lowering device to the pedestals of the secondary lowering device. The primary lowering device now increases its downward speed and the tines are withdrawn allowing the pedestals to continue incrementally to lower the stack as it continues to build via the ferris wheel. Meanwhile, the primary device, with the tines withdrawn, moves back up to its starting elevation. When a pre-determined count is reached and the stack is completed, the tines of the primary device rapidly move in over the top of the complete stack and into position to receive the first tortilla of the next stack. The complete stack, supported by the secondary lowering device, continues downward and when the top of the pedestals of the secondary lowering device move below the conveyor belt 140, the stack is free to move with the belt out of the device and continue in the system. When the stack is clear of the pedestal of the secondary lowering device, the device starts moving upward and continues until it reaches its uppermost position and there awaits transfer to it of a new partial stack of tortillas from the primary lowering device. The sequence may then be carried out repeatedly, while the stacks of tortillas so accumulated arre collated, grouped, and packaged as hereinbefore described.

Figure 9:
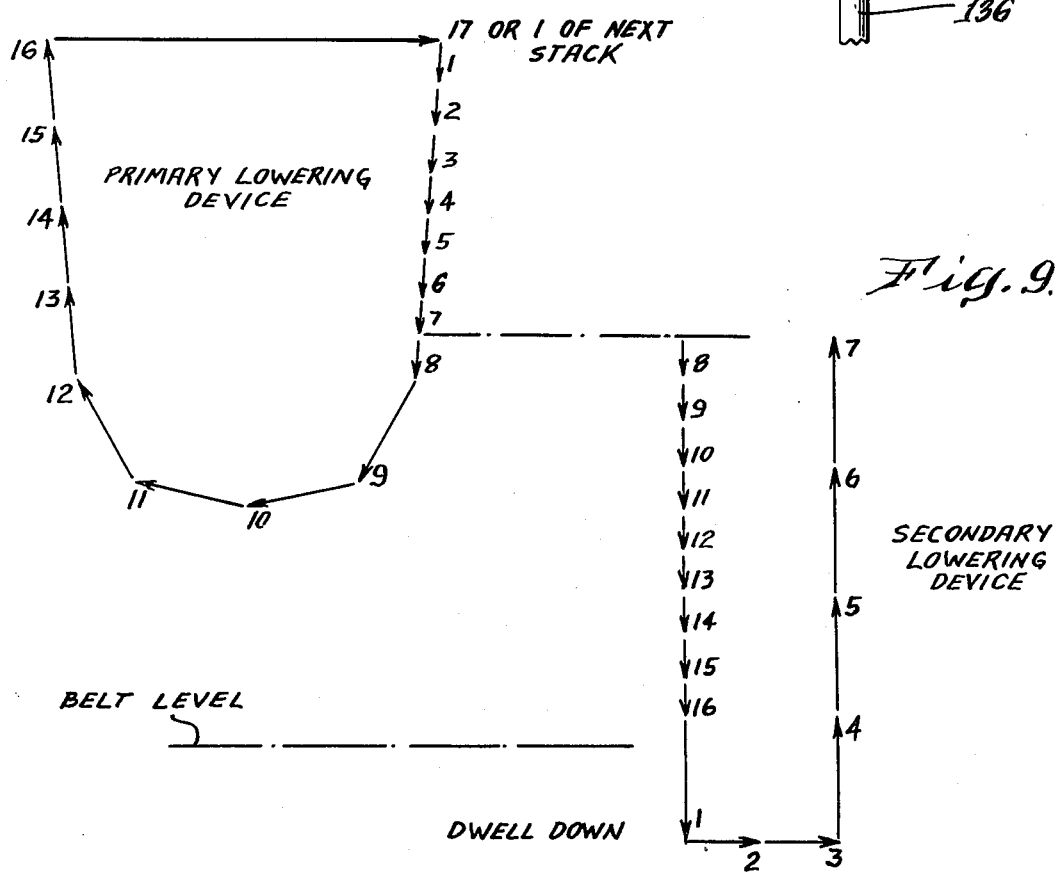
FIG. 9 is a sequence diagram for an embodiment of the present invention.

This sequence of steps as between the primary and the secondary lowering devices is illustrated in FIG. 9. This figure shows schematically the sequential positional relationship between the two devices on a time basis. The left hand portion shows the sequential step traveled by a point on the tines 120, and the righthand portion shows the comparable sequence for the secondary lowering mechanism. The number on each represent the positions of the tines and the pedestal laps respectively at sequential points in time bearing comparable number designations, in accordance with the foregoing description.

It is to be understood that the embodiments of this invention herein described and illustrated are of by way of illustration and not of limitation, and that other embodiments of this invention may be made by those skilled in the art without departing from the spirit or scope of this invention.

For example, although the embodiment herein described comprises a spacer member means in the form of dual chains with spacer means affixed thereto, it should be understood that this invention includes embodiments wherein there is a single chain or other member with spacer means affixed thereto, since it is within the contemplation of this invention that such an embodiment, as well as other embodiments comprising dual or other multiple forms of members, may be utilized without the middle conveyor belt that has been described herein.

Thus, it should be understood that this invention may take the form of any of a wide variety of embodiments.

We claim:

1. Apparatus for positionally collating flat objects comprising
    a multiplicity of spacer means which are spaced apart from each other, and are affixed to and project upward from spacer member means adapted for causing said spacer means to move in a desired direction,
    path means for moveably supporting said spacer member means and for cooperatively acting with said spacer member means to cause said spacer member means to move through at least two substantially flat, adjacent path portions which are oriented in tandem with respect to each other in said desired direction, each tandem pair of which portions are spaced apart by a separation,
    outside conveyor means comprising endless continuums which are moveable in said direction and are substantially co-extensive with and positioned beside each side of said spacer member means and across each of said separations, and which, throughout said portions and across each of said separations, have top surfaces which are substantially co-planar with each other, and, throughout said portions, are in a plane which is substantially parallel to said path of movement of said spacer member means but is below the tops of said spacer means,
    and means for causing said spacer member means and said outside conveyor means to move in said direction, with said outside conveyor means moving faster than said spacer member means,
    said spacer member means and said path means being so cooperatively arranged as to cause spacer members traveling in said direction that have traversed one of said portions and have come to the end thereof closest to a separation to diverge downward from the associated plane described by the tops of said outside conveyor means to such an extent that a point of divergence is reached where the tops of the spacer means move below said plane,
    said spacer member means and said path means being so cooperatively arranged as to cause said spacer means to converge upward at the end of said adjacent portion closest to a separation to such an extent that a point of convergence is reached where the tops of said converging spacer means move above the associated plane described by said outside conveyor means,
    said path means being adapted to achieve synchronization of the passing of spacers through said point of convergence with respect to the movement of said outside conveyor means, and thereby to effect desired separation between spacer means passing through said point of convergence and each place on the top surface of said outside conveyor means determined by a location thereon which is adjacent to spacer means passing said point of divergence, as said place is the next among such places to approach said point of convergences as said outside conveyor means moves in said direction.

2. The apparatus described in claim 1 wherein said spacer member means comprises at least one pair of endless continuums which are positioned spaced apart from each other in side-by-side relationship, with the spacer means affixed to each being paired with spacer means affixed to the spacer member means with which it is paired, the spacer means comprising each such pair of spacer means being positioned on their respective spacer member means at locations described by the intercept of the long axes of said continuums with an imaginary line which is normal to both of said axes.

3. The apparatus described in claim 2, including a middle conveyor means comprising at least one endless continuum moveable in the direction of and positioned between each pair of endless continuums comprising said spacer member means, said middle conveyor means traversing said portions and each of said separations, with its top surfaces co-planar with those of the continuums comprising said outside conveyor means, and means for causing said middle conveyor means to move in said direction with a speed at least as great as that of said outside conveyor means.

4. The apparatus described in claim 3 wherein the speed of said middle conveyor means is greater than that of said outside conveyor means.

5. The apparatus described in claim 1 wherein said spacer member means in one of said portions is a continuation of the spacer member means in an adjacent portion.

6. The apparatus described in claim 2 wherein said spacer member means in one of said portions is a continuation of the spacer member means in an adjacent portion.

7. The apparatus described in claim 4 wherein said spacer member means in one of said portions is a continuation of the spacer member means in an adjacent portion.

8. The apparatus described in claim 1 in combination with removal means for removing objects from said apparatus.

9. The apparatus described in claim 1 in combination with removal means for removing objects from said apparatus wherein said removal means comprises a wheel so positioned with respect to the plane described by the tops of said conveyor means at the end of the last of said portions in said apparatus to be traversed by said outside conveyor means that said plane is substantially tangential to the topmost point on said wheel, and wherein said wheel includes clips for grasping objects delivered thereto by said conveyor means and for holding same while said wheel turns, said apparatus including means for causing said clips to so open as to release their hold on said objects as they are carried by said wheel in the region of the bottommost point on the circumference of said wheel.

10. The apparatus described in claim 9 including means to cause said wheel to rotate intermittantly and to be stopped at each point in time when said conveyor means delivers an object thereto, and including cam means for causing the clips positioned at the topmost and the bottommost points on the circumference of said wheel to be open when the rotation of said wheel has stopped.

11. The apparatus described in claim 12 in combination with removal means for removing objects from said apparatus wherein said removal means comprises a wheel so positioned with respect to the plane described by the tops of said conveyor means at the end of the last of said portions in said apparatus to be traversed by said outside conveyor means that said plane is substantially tangential to the topmost point on said wheel, and wherein said wheel includes clips for grasping objects delivered thereto by said conveyor means and for holding same while said wheel turns, said apparatus including means for causing said clips to so open as to release their hold on said objects as they are carried by said wheel in the region of the bottommost point on the circumference of said wheel.

12. The apparatus described in claim 4 in combination with removal means for removing objects from said apparatus wherein said removal means comprises a wheel so positioned with respect to the plane described by the tops of said conveyor means at the end of the last of said portions in said apparatus to be traversed by said outside conveyor means that said plane is substantially tangential to the topmost point on said wheel, and wherein said wheel includes clips for grasping objects delivered thereto by said conveyor means and for holding same while said wheel turns, said apparatus including means for causing said clips to so open as to release their hold on said objects as they are carried by said wheel in the region of the bottommost point on the circumference of said wheel.

13. The apparatus described in claim 5 in combination with removal means for removing objects from said apparatus wherein said removal means comprises a wheel so positioned with respect to the plane described by the tops of said conveyor means at the end of the last of said portions in said apparatus to be traversed by said outside conveyor means that said plane is substantially tangential to the topmost point on said wheel, and wherein said wheel includes clips for grasping objects delivered thereto by said conveyor means and for holding same while said wheel turns, said apparatus including means for causing said clips to so open as to release their hold on said objects as they are carried by said wheel in the region of the bottommost point on the circumference of said wheel.

14. The apparatus described in claim 6 in combination with removal means for removing objects from said apparatus wherein said removal means comprises a wheel so positioned with respect to the plane described by the tops of said conveyor means at the end of the last of said portions in said apparatus to be traversed by said outside conveyor means that said plane is substantially tangential to the topmost point on said wheel, and wherein said wheel includes clips for grasping objects delivered thereto by said conveyor means and for holding same while said wheel turns, said apparatus including means for causing said clips to so open as to release their hold on said objects as they are carried by said wheel in the region of the bottommost point on the circumference of said wheel.

15. The apparatus described in claim 7 in combination with removal means for removing objects from said apparatus wherein said removal means comprises a wheel so positioned with respect to the plane described by the tops of said conveyor means at the end of the last of said portions in said apparatus to be traversed by said outside conveyor means that said plane is substantially tangential to the topmost point on said wheel, and wherein said wheel includes clips for grasping objects delivered thereto by said conveyor means and for holding same while said wheel turns, said apparatus including means for causing said clips to so open as to release their hold on said objects as they are carried by said wheel in the region of the bottommost point on the circumference of said wheel.

16. The apparatus described in claim 11 including means to cause said wheel to rotate intermittantly and to be stopped at each point in time when said conveyor means delivers an object thereto, and including cam means for causing the clips positioned at the topmost and the bottommost points on the circumference of said wheel to be open when the rotation of said wheel has stopped.

17. The apparatus described in claim 12 including means to cause said wheel to rotate intermittantly and to be stopped at each point in time when said conveyor means delivers an object thereto, and including cam means for causing the clips positioned at the topmost and the bottommost points on the circumference of said wheel to be open when the rotation of said wheel has stopped.

18. The apparatus described in claim 13 including means to cause said wheel to rotate intermittantly and to be stopped at each point in time when said conveyor means delivers an object thereto, and including cam means for causing the clips positioned at the topmost and the bottommost points on the circumference of said wheel to be open when the rotation of said wheel has stopped.

19. The apparatus described in claim 14 including means to cause said wheel to rotate intermittantly and to be stopped at each point in time when said conveyor means delivers an object thereto, and including cam means for causing the clips positioned at the topmost and the bottommost points on the circumference of said wheel to be open when the rotation of said wheel has stopped.

20. The apparatus described in claim 15 including means to cause said wheel to rotate intermittantly and to be stopped at each point in time when said conveyor means delivers an object thereto, and including cam means for causing the clips positioned at the topmost and the bottommost points on the circumference of said wheel to be open when the rotation of said wheel has stopped.

21. The device described in claim 9 including a stacker device comprising a plurality of parallel, horizontal tines to receive objects as they are released from said wheel,
- means for causing said tines to lower incrementally as each object is placed thereon,
- vertical pedestals which are interspersed between said tines and are adapted to have their tops bear the accumulation of objects supported by said tines when said tines have lowered to a desired amount,
- means for thereafter causing said pedestals to lower incrementally and for causing said tines to withdraw from under said accumulation, and for causing said tines to elevate to a position below and to one side of the bottommost point on the circumference of said wheel,
- conveyor means to receive and carry away said accumulations of objects after a desired number of objects has been received,
- and means for thereafter causing said tines to move laterally to a position beneath said bottommost point on said wheel and for thereafter causing said pedestals to elevate to a position beneath said tines.

22. The device described in claim 11 including a stacker device comprising
- a plurality of parallel, horizontal tines to receive objects as they are released from said wheel,
- means for causing said tines to lower incrementally as each object is placed thereon,
- vertical pedestals which are interspersed between said tines and are adapted to have their tops bear the accumulation of objects supported by said tines when said tines have lowered to a desired amount,
- means for thereafter causing said pedestals to lower incrementally and for causing said tines to withdraw from under said accumulation, and for causing said tines to elevate to a position below and to one side of the bottommost point on the circumference of said wheel,
- conveyor means to receive and carry away said accumulations of objects after a desired number of objects has been received,
- and means for thereafter causing said tines to move laterally to a position beneath said bottommost point on said wheel and for thereafter causing said pedestals to elevate to a position beneath said tines.

23. The device described in claim 12 including a stacker device comprising
- a plurality of parallel, horizontal tines to receive objects as they are released from said wheel,
- means for causing said tines to lower incrementally as each object is placed thereon,
- vertical pedestals which are interspersed between said tines and are adapted to have their tops bear the accumulation of objects supported by said tines when said tines have lowered to a desired amount,
- means for thereafter causing said pedestals to lower incrementally and for causing said tines to withdraw from under said accumulation, and for causing said tines to elevate to a position below and to one side of the bottommost point on the circumference of said wheel,
- conveyor means to receive and carry away said accumulations of objects after a desired number of objects has been received,
- and means for thereafter causing said tines to move laterally to a position beneath said bottommost point on said wheel and for thereafter causing said pedestals to elevate to a position beneath said tines.

24. The device described in claim 13 including a stacker device comprising
- a plurality of parallel, horizontal tines to receive objects as they are rleased from said wheel,
- means for causing said tines to lower incrementally as each object is placed thereon,
- vertical pedestals which are interspersed between said tines and are adapted to have their tops bear the accumulation of objects supported by said tines when said tines have lowered to a desired amount,
- means for thereafter causing said pedestals to lower incrementally and for causing said tines to withdraw from under said accumulation, and for causing said tines to elevate to a position below and to one side of the bottommmost point on the circumference of said wheel,
- conveyor means to receive and carry away said accumulations of objects after a desired number of objects has been received,
- and means for thereafter causing said tines to move laterally to a position beneath said bottommost point on said wheel and for thereafter causing said pedestals to elevate to a position beneath said tines.

25. The device described in claim 14 including a stacker device comprising
- a plurality of parallel, horizontal tines to receive objects as they are released from said wheel,
- means for causing said tines to lower incrementally as each object is placed thereon,
- vertical pedestals which are interspersed between said tines and are adapted to have their tops bear the accumulation of objects supported by said tines when said tines have lowered to a desired amount,
- means for thereafter causing said pedestals to lower incrementally and for causing said tines to withdraw from under said accumulation, and for causing said tines to elevate to a position below and to one side of the bottommost point on the circumference of said wheel,
- conveyor means to receive and carry away said accumulations of objects after a desired number of objects has been received,
- and means for thereafter causing said tines to move laterally to a position beneath said bottommost point on said wheel and for thereafter causing said pedestals to elevate to a position beneath said tines.

26. The device described in claim 15 including a stacker device comprising
- a plurality of parallel, horizontal tines to receive objects as they are released from said wheel,
- means for causing said tines to lower incrementally as each object is placed thereon,
- vertical pedestals which are interspersed between said tines and are adapted to have their tops bear the accumulation of objects supported by said tines when said tines have lowered to a desired amount, means for thereafter causing said pedestals to lower incrementally and for causing said tines to withdraw from under said accumulation, and for causing said tines to elevate to a position below and to one side of the bottommost point on the circumference of said wheel, conveyor means to receive and carry away said accumulations of objects after a desired number of objects has been received, and means for thereafter causing said tines to move laterally to a position beneath said bottommost point on said wheel and for thereafter causing said pedestals to elevate to a position beneath said tines.

27. The device described in claim 10 including a stacker device comprising a plurality of parallel, horizontal tines to receive objects as they are released from said wheel, means for causing said tines to lower incrementally as each object is placed thereon, vertical pedestals which are interspersed between said tines and are adapted to have their tops bear the accumulation of objects supported by said tines when said tines have lowered to a desired amount, means for thereafter causing said pedestals to lower incrementally and for causing said tines to withdraw from under said accumulation, and for causing said tines to elevate to a position below and to one side of the bottommost point on the circumference of said wheel, conveyor means to receive and carry away said accumulations of objects after a desired number of objects has been received, and means for thereafter causing said tines to move laterally to a position beneath said bottommost point on said wheel and for thereafter causing said pedestals to elevate to a position beneath said tines.

28. The device described in claim 16 including a stacker device comprising a plurality of parallel horizontal tines to receive objects as they are released from said wheel, means for causing said tines to lower incrementally as each object is placed thereon, vertical pedestals which are interspersed between said tines and are adapted to have their tops bear the accumulation of objects supported by said tines when said tines have lowered to a desired amount, means for thereafter causing said pedestals to lower incrementally and for causing said tines to withdraw from under said accumulation, and for causing said tines to elevate to a position below and to one side of the bottommost point on the circumference of said wheel, conveyor means to receive and carry away said accumulations of objects after a desired number of objects has been received, and means for thereafter causing said tines to move laterally to a position beneath said bottommost point on said wheel and for thereafter causing said pedestals to elevate to a position beneath said tines.

29. The device described in claim 17 including a stacker device comprising a plurality of parallel horizontal tines to receive objects as they are released from said wheel, means for causing said tines to lower incrementally as each object is placed thereon, vertical pedestals which are interspersed between said tines and are adapted to have their tops bear the accumulation of objects supported by said tines when said tines have lowered to a desired amount, means for thereafter causing said pedestals to lower incrementally and for causing said tines to withdraw from under said accumulation, and for causing said tines to elevate to a position below and to one side of the bottommost point on the circumference of said wheel, conveyor means to receive and carry away said accumulations of objects after a desired number of objects has been received, and means for thereafter causing said tines to move laterally to a position beneath said bottommost point on said wheel and for thereafter causing said pedestals to elevate to a position beneath said tines.

30. The device described in claim 18 including a stacker device comprising a plurality of parallel horizontal tines to receive objects as they are released from said wheel, means for causing said tines to lower incrementally as each object is placed thereon, vertical pedestals which are interspersed between said tines and are adapted to have their tops bear the accumulation of objects supported by said tines when said tines have lowered to a desired amount, means for thereafter causing said pedestals to lower incrementally and for causing said tines to withdraw from under said accumulation, and for causing said tines to elevate to a position below and to one side of the bottommost point on the circumference of said wheel, conveyer means to receive and carry away said accumulations of objects after a desired number of objects has been received, and means for thereafter causing said tines to move laterally to a position beneath said bottommost point on said wheel and for thereafter causing said pedestals to elevate to a position beneath said tines.

31. The device described in claim 19 including a stacker device comprising a plurality of parallel horizontal tines to receive objects as they are released from said wheel, means for causing said tines to lower incrementally as each object is placed thereon, vertical pedestals which are interspersed between said tines and are adapted to have their tops bear the accumulation of objects supported by said tines when said tines have lowered to a desired amount, means for thereafter causing said pedestals to lower incrementally and for causing said tines to withdraw from under said accumulation, and for causing said tines to elevate to a position below and to one side of the bottommost point on the circumference of said wheel, conveyor means to receive and carry away said accumulations of objects after a desired number of objects has been received, and means for thereafter causing said tines to move laterally to a position beneath said bottommost point on said wheel and for thereafter causing said pedestals to elevate to a position beneath said tines.

32. The device described in claim 20 including a stacker device comprising a plurality of parallel horizontal tines to receive objects as they are released from said wheel, means for causing said tines to lower incrementally as each object is placed thereon, vertical pedestals which are interspersed between said tines and are adapted to have their tops bear the accumulation of objects suppported by said tines when said tines have lowered to a desired amount, means for thereafter cuasing said pedestals to lower incrementally and for causing said tines to withdraw from under said accumulation, and for causing said tines to elevate to a position below and to one side of the bottommost point on the circumference of said wheel, conveyor means to receive and carry away said accumulations of objects after a desired number of objects has been received, and means for thereafter causing said tines to move laterally to a position beneath said bottommost point on said wheel and for thereafter causing said pedestlas to elevate to a position beneath said tines.

33. Apparatus for positionally collating flat, supple objects comprising at least two parallel, endless outside conveyor belts, and at least one endless inside conveyor belt positioned between said outside conveyor belts and parallel therewith, all of said conveyor belts being flat and endless and having top surfaces which are co-planar with each other, endless spacer chains which are positioned between said inside and said outside conveyor belts, slightly below the plane of the tops of said belts, and have spacers affixed thereto which project upward therefrom and are equally spaced along each chain with each spacer on one of said chains being side-by-side with a spacer on the other of said chains, means for causing said conveyor belts and said chains to move in a given direction, and for causing said chains to move at the same speed as each other and for causing said outside conveyor belts to move at the same speed as each other, and for causing said chains to move slowest and said outside conveyor belts to move next to slowest as among said chains, said outside and said inside conveyor belts, and synchronization means adapted to cause said chains to dip downward as they move in said direction in the mid-region of the topmost path of travel of said conveyor belts to cause the tops of the spacers affixed thereto to dip below the plane of the tops of said conveyor belts and to rise again while in said mid-region to such an extent that the tops of said spacers are above said plane, said synchronization means being adapted to permit regulation of the spatial relationship between said tops of said spacers as they move out of said dip and above said plane and points on said conveyor belts which are adjacnet to said spacers when said spacers dip below said plane of said tops of said conveyor belts.

34. The apparatus described in claim 33 in combination with means for removing objects from said apparatus comprising a wheel so positioned with respect to the plane described by the tops of said conveyor belts at the end of said inside conveyor belt toward which said belt normally travels that it is substantially tangential to the topmost point of said wheel, and wherein said wheel includes clips for grasping objects delivered thereto by said conveyor belts and for holding same while said wheel turns, said apparatus including means for causing said clips to so open as to release their hold on said objects as they are carried by said wheel in the region of the bottommost point on the circumference of said wheel.

35. The apparatus described in claim 34 including means to cause said wheel to rotate intermittantly and to be stopped at each point in time when said conveyor means delivers an object thereto, and including cam means for causing the clips positioned at the topmost and the bottommost points on the circumference of said wheel to be open when the rotation of said wheel has stopped.

36. The device described in claim 34 including a stacker device comprising a plurality of parallel, horizontal tines to receive objects as they are released from said wheel, means for causing said tines to lower incrementally as each object is placed thereon, vertical pedestals which are interspersed between said tines and are adapted to have their tops bear the accumulation of objects supported by said tines when said tines have lowered to a desired amount, means for thereafter causing said pedestals to lower incrementally and for causing said tines to withdraw from under said accumulation, and for causing said tines to elevate to a position below and to one side of the bottommost point on the circumference of said wheel, conveyor means to receive and carry away said accumulations of objects after a desired number of objects has been received, and means for thereafter causing said tines to move laterally to a position beneath said bottommost point on said wheel and for thereafter causing said pedestals to elevate to a position beneath said tines.

37. The device described in claim 35 including a stacker device comprising a plurality of parallel, horizontal tines to receive objects as they are released from said wheel, means for causing said tines to lower incrementally as each object is placed thereon, vertical pedestals which are interspersed between said tines and are adapted to have their tops bear the accumulation of objects supported by said tines when said tines have lowered to a desired amount, means for thereafter causing said pedestals to lower incrementally and for causing said tines to withdraw from under said accumulation, and for causing said tines to elevate to a position below and to one side of the bottommost point on the circumference of said wheel, conveyor means to receive and carry away said accumulations of objects after a desired number of objects has been received, and means for thereafter causing said tines to move laterally to a position beneath said bottommost point on said wheel and for thereafter causing said pedestals to elevate to a position beneath said tines.

* * * * *